March 22, 1938. W. W. EDSON 2,112,081
NETWORK PROTECTOR TRIPPING APPARATUS
Filed Oct. 16, 1936
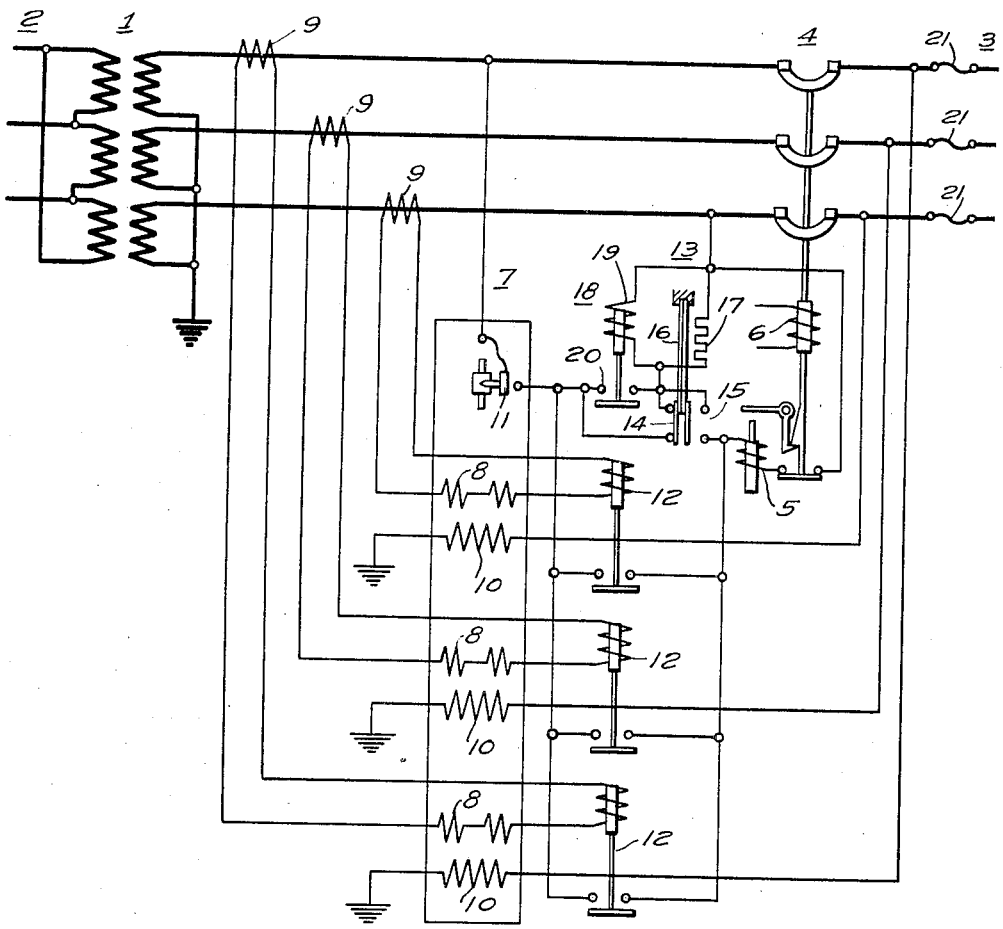
WITNESSES:
INVENTOR
William W. Edson.
BY
ATTORNEY Patented Mar. 22, 1938

2,112,081

UNITED STATES PATENT OFFICE 2,112,081

NETWORK PROTECTOR TRIPPING APPARATUS

William W. Edson, Auburndale, Mass., assignor to Westinghouse Electric & Manufacturing Company, East Pittsburgh, Pa., a corporation of Pennsylvania Application October 16, 1936, Serial No. 105,909

7 Claims. (Cl. 175—294)

My invention relates to network protectors for use in alternating-current network distribution systems, and particularly to an improved form of protective apparatus, for tripping the circuit breakers of such protectors.

In alternating-current network distribution systems, a network load circuit, comprising a plurality of interconnected load conductors, is supplied by means of step-down network transformers from a plurality of distribution feeders. The network protectors, each comprising a network circuit breaker and its associated control apparatus, are connected in the secondary leads of the step-down transformers.

The network protector is usually provided with a polyphase power-directional master relay which serves to trip the network circuit breaker in the event of a reverse power flow of fault magnitude, representing a short-circuit on the associated step-down transformer or distribution feeder. In some cases, also the polyphase master relay is adjusted to respond to the comparatively small flow of reverse power occasioned by magnetizing losses of the associated transformer bank, when the feeder circuit is open and such magnetizing losses are supplied in reverse direction from the network.

The latter adjustment provides a convenient means for entirely disconnecting a feeder and its associated transformers, under control of a central station operator, thereby avoiding the necessity of sending a man out to trip open all of the network protectors by hand. However, in the absence of special provisions to prevent unnecessary protector operations, such a sensitive reverse-power setting would result in the opening of the protectors in response to regenerative motor loads, synchronizing operations and various other minor disturbances which produce momentary or sustained reverse power flow of comparatively small magnitude. As the protectors are usually designed to reclose automatically when the relationship of network and feeder voltages is satisfactory for such reclosure, the sensitive reverse power setting ordinarily results in many unnecessary operations.

In order to prevent unnecessary protector operations and at the same time preserve the protective ability of the master relay and the ability to clear the feeder by opening the feeder breaker, a number of expedients have been proposed. One such expedient consists in adding an overcurrent relay of sufficiently high setting to remain open in response to magnetizing current but to close under fault conditions, and also a timing relay connected to be energized when reverse power flows through the protector. The network circuit breaker is connected to be tripped when the master relay and either the overcurrent relay or the timing relay are in circuit closing condition. It has been found that unless the timing relay of such an arrangement is of special construction, it will not fully reset, after a tripping operation, before the circuit breaker closes. If, after the circuit breaker recloses, the original circuit condition which caused the circuit breaker to trip still exists, the circuit breaker will again trip without time delay, and in some cases pumping, or repeated opening and closing will occur.

It is an object of the present invention to provide a novel network protector tripping circuit, of the type indicated above, which will permit the use of any form of timing relay without possibility of operation of the same within a time interval less than its normal operating time.

A further object of my invention is to provide a novel network protector tripping circuit employing a thermal time relay.

Other objects of my invention will become evident from the following detailed description taken in conjunction with the accompanying drawing, in which the single figure is a diagrammatic view of a network protector tripping system embodying my invention.

Referring to the drawing in detail, a transformer bank 1, having its primary windings connected in delta and its secondary windings connected in star with neutral grounded, is supplied from a polyphase distribution feeder 2, and is arranged to be connected to a polyphase network load circuit 3 by means of a network circuit breaker 4. The circuit breaker 4 is provided with a trip coil 5 and with suitable automatic phasing or closing apparatus, which latter forms no part of the present invention, and has, for simplicity, been indicated diagrammatically as a closing coil 6. In a practical embodiment of my invention, I prefer to use automatic reclosing or phasing apparatus of the general type disclosed in the U. S. patent to Granville E. Palmer, No. 1,597,865, August 31, 1926, assigned to the Westinghouse Electric & Manufacturing Company.

A polyphase power-directional master relay 7, having current windings 8 connected to suitable current transformers 9, and having potential windings 10 connected to the network 3, is provided for tripping the circuit breaker 4 in the event of fault conditions on the feeder 2 or transformer bank 1. The master relay 7 is also provided with phasing windings (not shown), used in the phasing or reclosing operation, in a manner well understood in the art. As the construction and operation of such master relays for network applications are well known, detailed illustration and description have been omitted. The master relay 7 is provided with tripping contacts 11, and is adjusted so that the latter close in response to the comparatively small power flow occasioned by magnetizing losses supplied to the transformer bank 1 when the feeder 2 is disconnected at its supply end, as by the opening of a feeder circuit breaker (not shown).

A plurality of instantaneous overcurrent relay elements 12 are included in series with the secondary windings of the current transformers 9, to respond to phase currents. The overcurrent relays 12 are designed or adjusted to remain open when merely magnetizing current for the transformer bank 1 flows through the network protector, but to close in the event of a fault on the feeder 2 or network 3.

A thermal relay 13 is provided for introducing a time delay in the tripping of the circuit breaker 4 in response to transformer magnetizing current. The thermal relay 13 is provided with back contacts 14 and front contacts 15. A movable bimetal, or other thermally-deformable, operating member 16 is arranged, in its initial position (as shown) to close the back contacts 14. Upon being heated, the operating member 16 is deformed to the right in the figure, to a final position in which the back contacts 14 are open, and the front contacts 15 are closed. The timing relay 13 is provided with a resistance heater 17 in thermally-conductive relationship to the operating member 16, the design being such that the relay 13 fully opens or closes in a period of time of the order of several seconds.

An auxiliary relay 18 having a closing coil 19 connected in parallel to the resistance heater 17, and having relay contacts 20 in parallel connection with the back contacts 14 of timing relay 13, is provided for preventing the establishment of an energizing circuit for the resistance heater 17 except when the operating member 16 is in its initial position.

The usual line fuses 21 are interposed between the circuit breaker 4 and the network circuit 3, in accordance with the usual practice.

The operation of the above-described apparatus may be set forth as follows: During normal conditions the power flow is from left to right in the figure, and the tripping contacts 11 remain open. In the event of a fault on the network 3, the fault is burned off in the usual manner. As the current values are large, one or more of the instantaneous overcurrent relays 12 may close during the flow of fault current. As the tripping contacts 11 remain open, however, no operation of the protector results.

In the event of a fault on the feeder 2 or in the transformer bank 1, a large flow of reverse power occurs from the network 3 through the circuit breaker 4, and the tripping contacts 11 of the master relay 7 close. As one or more of the phase currents rise to fault magnitude of the order of twenty times normal full load, the corresponding overcurrent relays 12 close to complete a trip circuit for the circuit breaker 4. The latter, accordingly, trips open.

Assuming that the feeder or transformer fault has been repaired and normal voltage conditions restored, the phasing or reclosing apparatus (not shown) operates to reclose the circuit breaker 4 when the transformer secondary voltage is higher than the network voltage and bears a predetermined phase relation thereto.

With the circuit breaker 4 closed and the various relays in the positions shown, the feeder 2 may be disconnected from the network 3 by opening the feeder circuit breaker (not shown) at the supply end of the feeder 2. Upon opening the feeder circuit breaker, the magnetizing losses of the transformer bank 1 and of other transformers connected to the feeder 2, are supplied in reverse direction from the network 3. The direction of power flow through the circuit breaker 4 accordingly reverses, and the tripping contacts 11 of the master relay 7 close. As the phase currents are below fault values, however, the overcurrent relays 12 all remain open.

The tripping contacts 11, in closing, establish a circuit, through back contacts 14, for the closing coil 19 of auxiliary relay 18 and the resistance heater 17 of the timing relay 13. As the bimetal operating member 16 requires several seconds to heat to operating temperature, the timing relay 13 does not immediately operate. The auxiliary relay 18, however, immediately closes to establish a circuit for the closing coil 19 and resistance heater 17, independent of the back contacts 14. With this circuit established, movement of the bimetal member away from its initial position, so that the back contacts 14 are open, does not interrupt the circuit for the heater. At the expiration of its time interval, the timing relay 13 closes to establish a tripping circuit for the circuit breaker 4, and the latter trips open.

Upon opening of the circuit breaker 4, the auxiliary relay 18 drops out, interrupting the circuit to the heater 17. If the circuit breaker 4 should immediately reclose, and the reverse power flow be reestablished, the circuit for the heater 17 would be open at back contacts 14, so that the tripping circuit could not be re-established. Under these conditions, the bimetal element 16 must cool sufficiently to return to its initial position (to the left in the figure) before a timing operation can again be initiated. In this way, the full time element of timing relay 13 is introduced during every tripping operation.

Momentary power reversals, such as caused by regenerative loads or synchronizing operations, may cause momentary engagement of the tripping contacts 11. However, as the overcurrent relays 12 and timing relay 13 remain open under these conditions, no tripping operation of the circuit breaker 4 occurs.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a network protector for an alternating-current network distribution system, a network circuit breaker, a protective device responsive to a predetermined abnormal circuit condition, a timing relay controlled by said protective device, said timing relay having an operating member movable during a timing cycle through a range of positions, an auxiliary relay, means effective when said operating member is in a predetermined position for operating said auxiliary relay, means effective upon operation of said auxiliary relay for maintaining said auxiliary relay in operated condition, and means effective when said auxiliary relay is in operated condition and said operating member is in a predetermined position for causing said circuit breaker to open.

2. In a network protector for an alternating-current network distribution system, a network circuit breaker, a protective device responsive to a predetermined abnormal circuit condition, a thermal timing relay controlled by said protective device, said timing relay having a thermally-deformable member movable during a timing cycle through a range of positions, an auxiliary relay, means effective when said thermally-deformable member is in a predetermined position for causing operation of said auxiliary relay, means effective upon operation of said auxiliary relay for maintaining said auxiliary relay in operated condition, and means effective when said auxiliary relay is in operated condition and said operating member is in a predetermined position for causing said circuit breaker to open.

3. In a network protector for an alternating-current network distribution system, a network circuit breaker, a protective device responsive to a predetermined abnormal circuit condition, a timing device controlled by said protective device, said timing device having an operating member movable from an initial position to a final position and having an energizing element, and means effective upon movement of said operating member to said final position for causing said circuit breaker to open and for preventing reenergization of said energizing element until said operating member has returned to said initial position.

4. In a network protector for controlling the flow of power through a network transformer connected between an alternating-current feeder circuit and an alternating-current network circuit, a network circuit breaker, a power-directional device responsive to power flow from said network circuit to said transformer, a timing device controlled by said power-directional device, said timing device having an operating member movable from an initial position to a final position and having an energizing element, means effective upon movement of said operating member to said final position for causing said circuit breaker to open and for preventing reenergization of said energizing element until said operating member has returned to said initial position, an overload device responsive to a load condition of said transformer, and means responsive to operation of said power-directional device and said over-load device for causing said circuit breaker to open independently of said timing device.

5. In a network protector for an alternating-current network distribution system, a network circuit breaker having a trip coil, a protective relay responsive to a predetermined abnormal circuit condition, said relay having normally open tripping contacts, a timing relay controlled by said protective relay, said timing relay having an energizing element, normally-open front contacts, and normally closed back contacts, an auxiliary relay having a closing element and normally-open relay contacts, and a connection for energizing said trip coil including said tripping contacts and said front contacts in series relationship and including said relay contacts and said back contacts in a parallel connection, and energizing connections for said energizing element and said closing element, said energizing connections being connected for energization in response to current flow through said parallel connection.

6. In a network protector for controlling the flow of power through a network transformer connected betwen an alternating-current feeder circuit and an alternating-current network circuit, a network circuit breaker, a power-directional device responsive to power flow from said network circuit to said transformer, a thermal timing device controlled by said power-directional device, said timing device having an operating member thermally deformable from an initial position to a final position and having a resistance heater, means effective upon movement of said operating member to said final position for causing said circuit breaker to open and for preventing reenergization of said resistance heater until said operating member has returned to said initial position.

7. In a network protector for controlling the flow of power through a network transformer connected between an alternating-current feeder circuit and an alternating-current network circuit, a network circuit breaker, a power-directional device responsive to power flow from said network circuit to said transformer, a thermal timing device having an operating member thermally deformable from an initial position to a final position and having a resistance heater, an overload device responsive to a fault condition on one of said circuits, means responsive to operation of said power directional device and either said timing device or said overload device for causing said circuit breaker to open, and means effective upon movement of said movable member to said final position for preventing reenergization of said resistance heater until said operating member has returned to said initial position.

WILLIAM W. EDSON.